United States Patent [19]

Shiomura et al.

[11] 4,128,607
[45] Dec. 5, 1978

[54] METHOD FOR THE PRODUCTION OF LOW DENSITY POLYETHYLENE

[75] Inventors: Tetsunosuke Shiomura; Youzou Kinoshita, both of Takaishi; Yoshio Kokue, Izumi, all of Japan

[73] Assignee: Mitsui Toatsu Chemicals, Inc., Tokyo, Japan

[21] Appl. No.: 785,252

[22] Filed: Apr. 6, 1977

[30] Foreign Application Priority Data

Apr. 6, 1976 [JP] Japan .................. 51-37765

[51] Int. Cl.² .................. C08F 4/02; C08F 4/64; C08F 210/00; C08F 297/08
[52] U.S. Cl. .................. 260/878 B; 526/75; 526/124; 526/125; 526/348; 526/348.6
[58] Field of Search .................. 526/75, 124, 125, 348, 526/350; 260/878 B

[56] References Cited

U.S. PATENT DOCUMENTS

| | | | |
|---|---|---|---|
| 3,067,183 | 12/1962 | Hagemeyer, Jr. et al. | 526/907 |
| 3,404,096 | 10/1968 | Lamborn | 526/159 |
| 3,575,948 | 4/1971 | Blunt | 526/159 |
| 3,676,415 | 7/1972 | Diedrich et al. | 526/348 |
| 3,789,036 | 1/1974 | Longi et al. | 526/348 |
| 3,917,575 | 11/1975 | Matsuura et al. | 526/350 |
| 4,004,071 | 1/1977 | Aishima et al. | 526/350 |
| 4,027,089 | 5/1977 | Aishima et al. | 526/348 |

OTHER PUBLICATIONS

"Copolymerization," Ed. by G. E. Hain, Interscience, New York (1964), pp. 96-99, 103-106, and 245-247.

Primary Examiner—Alan Holler
Attorney, Agent, or Firm—Sughrue, Rothwell, Mion, Zinn and Macpeak

[57] ABSTRACT

In producing a low density polyethylene by copolymerization in slurry state of ethylene and an α-olefin with use of a catalyst consisting of a supported titanium component and an organoaluminum compound, a certain amount of ethylene is subject to pre-polymerization in the presence of said catalyst prior to the copolymerization. Successively, the copolymerization of ethylene and an α-olefin is effected in a two-step process, in which a copolymerization ratio of α-olefin to ethylene is kept at a low level in the first step and raised to a high level in the second step thereby to obtain a low density polyethylene having a density of not higher than 0.945 g/cm³.

1 Claim, 1 Drawing Figure

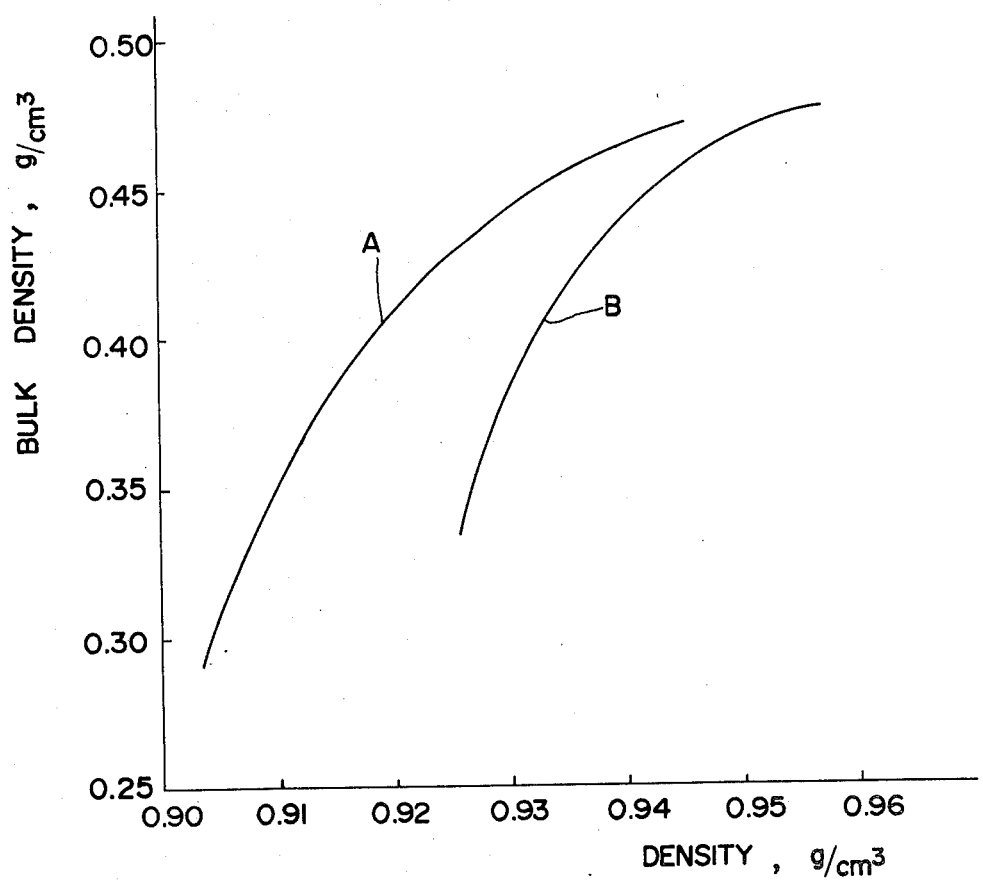

METHOD FOR THE PRODUCTION OF LOW DENSITY POLYETHYLENE

BACKGROUND OF THE INVENTION

This invention relates to a method for the production of a low density polyethylene having a density of not higher than 0.945 g/cm$^3$ (according to ASTM D-1505) by copolymerization in slurry state of ethylene and an α-olefin in the presence of a high activity catalyst.

When a slurry polymerization by the so-called, medium pressure-low pressure polymerization process is applied for the production of a low density polyethylene, a considerable amount (more than 5 weight %) of the resulting polymer is extracted in the polymerization solvent so that the bulk density of polymer particles is extremely reduced, and the polymer slurry becomes viscous and accordingly, advancing of polymerization reaction encounters difficulties. Particularly, it was impossible to produce low density polyethylenes of not higher than 0.927 g/cm$^3$ by the slurry polymerization. Accordingly, low density grades having the density range of from 0.915 to 0.927 g/cm$^3$, which corresponds to that of the low density polyethylene from the so-called, high pressure polymerization process have, hitherto, been not handled in the catalogues of polyethylene products from the so-called, low pressure polymerization process. By way of Example, according to Hydrocarbon Processing, Nov. (1972) 97 and ibid Nov. (1973) 167, the density of products is limited to the range of 0.940–0.965 g/cm$^3$ or 0.947–0.969 g/cm$^3$.

On the other hand, use of supported catalysts with a high activity has been proposed to obtain the polymer slurry easy to handle. For example, U.S. Pat. No. 3,888,835 discloses a process for the polymerization of ethylene, in which a high activity catalyst having a titanium compound supported on a magnesium compound is used and such a low-boiling hydrocarbon as butane is used as a diluent for polymerization.

However, when this process is applied to the production of the low density polyethylene having a density of 0.935 g/cm$^3$ or less through copolymerization of ethylene with an α-olefin, the resulting polymer is reduced in bulk density and thus it is difficult to obtain the polymer slurry easy to handle. Particularly, the lowering of the polymer bulk density results in lowering of an agitation efficiency of the reactor for polymerization unless the resulting polymer concentration per unit quantity of the polymerization solvent used is controlled at a low level, and thus the dissolution velocity of ethylene into the solvent is lowered so that advancing of polymerization reaction becomes substantially impossible.

Further, the lowering of bulk density or the formation of bulky polymer particles brings about troubles in the after-treatment of the polymer slurry, for example, filtrating of the slurry, separating of the solvent and drying of the polymer particles encounter a great difficulty.

Furthermore, in the producing of the low density polyethylene by the slurry polymerization, it was exceedingly difficult to avoid such troubles as deposition of polymers on the wall of polymerization equipments and sedimentation of coarse polymer particles.

SUMMARY OF THE INVENTION

An object of this invention is to provide a slurry polymerization method of ethylene and an α-olefin for producing a low density polyethylene of not higher than 0.945 g/cm$^3$ conveniently in a commercial scale while maintaining the bulk density of polymer particles at a high level and preventing a polymer slurry from increasing of the viscosity.

Another object of this invention is to provide a method for producing the low density polyethylene having a bulk density of higher than 0.30 g/cm$^3$ by the slurry copolymerization of ethylene and an α-olefin in the presence of a supported catalyst of high activity eliminating steps for removing of the catalyst residue.

A further object of this invention is to provide a low density polyethylene having a bulk density of higher than 0.30 g/cm$^3$ and a density of about 0.91 g/cm$^3$.

In accordance with this invention, there is provided a method for the production of the low density polyethylene of not higher than 0.945 g/cm$^3$ by copolymerizing ethylene and an α-olefin, which comprises:

(i) using a catalyst consisting essentially of (A) a catalyst component having titanium tetrachloride supported on a magnesium compound or a mixture or reaction product thereof with an aluminum compound and (B) an organoaluminum compound, (ii) subjecting ethylene to pre-polymerization in the presence of said catalyst prior to the copolymerization, the amount of ethylene to be pre-polymerized being within the range of 1.0 to 50 g per 1.0 g of said catalyst component (A), (iii) conducting the copolymerization of ethylene and an α-olefin in a two-step process as follows:

(a) first, conducting the copolymerization until polymers of 10 to 80% by weight based on a finally resulting polymer have been formed while controlling a copolymerization ratio of α-olefin to ethylene at less than 3.0% by weight, and (b) completing the polymerization reaction while elevating the copolymerization ratio of α-olefin to ethylene till the range of 3.0 to 20% by weight, and (iv) conducting said copolymerization in slurry state in the presence of a hydrocarbon solvent having a boiling point of not higher than 40° C. at temperatures of not higher than 100° C.

BRIEF DESCRIPTION OF THE DRAWING

The accompanying drawing is a graph indicating the relation between the bulk density and density of polymer, in which curve A relates to the low density polyethylene of this invention and, for a comparison curve B is set forth concerning polymers obtained by using an one-step process for copolymerization instead of the two-step process according to this invention.

DETAILED DESCRIPTION OF THE INVENTION

Examples of the magnesium compound which may be used as a support for the catalyst component (A) include magnesium halides such as magnesium chloride and magnesium bromide, magnesium oxyhalides such as magnesium hydroxychloride, magnesium oxide, magnesium hydroxide, magnesium carbonate, basic magnesium carbonate, magnesium sulphate, dialkoxy magnesium, magnesium carboxylates and others.

A mixture or reaction product of the magnesium compound with an aluminum compound may be also used as the support. Examples of the aluminum compound which may be used are aluminum oxide, aluminum hydroxide and organoaluminum compounds such as triisopropoxyaluminum. As the support, further, there may be used a double hydroxide of magnesium and aluminum, having a crystal structure of hydrotalcite or manasseit, or heat-treated products thereof.

Titanium tetrachloride may be supported in an amount of preferably, 0.5 to 20% by weight (Ti content 0.13-5 weight %). The supporting of titanium tetrachloride is carried out in the conventional methods, for example, by reacting the support with titanium tetrachloride while heating or by copulverizing these two components in a mill. In the latter, an aluminum halide-ether complex such as aluminum chloride-diphenylether complex, and dimethylpolysiloxane may be added as a third component.

The organoaluminum compound which may be used is represented by the formula, $$Al\ R_n X_{3-n}$$

wherein R is a hydrocarbon residue, X is halogen, alkoxy or hydrogen atom and n is 1 to 3. The typical examples include trialkylaluminum such as triethylaluminum and triisobutylaluminum, dialkylaluminum monohydrides such as diethylaluminum monohydride and diisobutylaluminum monohydride, dialkylaluminum monohalides such as diethylaluminum monochloride, diethylaluminum monoethoxide, ethylaluminum ethoxymonochloride and the like.

The component (B) is used within the range of 1-1000 moles, preferably 2 to 500 moles based on 1 mole of the component (A).

According to this invention, ethylene of 1 to 50 g, preferably 1 to 40 g per 1 g of the catalyst component (A) is subject to a pre-polymerization in an inert solvent in the presence of the catalyst consisting of components (A) and (B) prior to the copolymerization.

Suitable inert solvents include, for example, butane, pentane, hexane, heptane, kerosene and the like. By this pre-polymerization of ethylene, the component (A) is covered with a thin layer of polyethylene and as a result, copolymers which are formed in the successive copolymerization reaction are maintained at a bulk density of higher than 0.30 g/cm$^3$, so that the resulting slurry exhibits a low apparent viscosity in a wide range of polymer concentration.

If the pre-polymerization amount of ethylene is less than 1.0 g per 1.0 g of the component (A), the preventing effect against the bulk density lowering cannot be obtained. On the contrary, if the pre-polymerization is conducted in a large amount exceeding 50 g per 1.0 g of the component (A), copolymers which are obtained in the next two-step copolymerization bring about irregularities of melt and fish-eyes in the course of fabrication so that the products are deteriorated in quality.

The pre-polymerization conditions such as solvents, temperature, pressure and molecular weight of the resulting polymer may be selected independent of the conditions of the next copolymerization. Preferably, the pre-polymerization is conducted at temperatures of 0° to 80° C. under pressures of normal pressure to 10 kg/cm$^2$ (Gauge pressure). It is also preferred that the molecular weight of the resulting polymer is controlled by adding hydrogen to the polymerization system.

The molecular weight is indicated by Melt Index (MI) according to ASTM D-1238.

Next, the copolymerization of ethylene and an α-olefin is carried out in a two-step process. Examples of α-olefins which may be used are propylene, butene-1, pentene-1, hexene-1, octene-1 and the like. In order to improve products in such properties as softness, clarity, resistance to environmental stress cracking and impact strength at low temperature, higher α-olefins are particularly preferred.

In the first step for copolymerization, the copolymerization ratio of α-olefin to ethylene should be controlled below 3.0% by weight. If the copolymerization ratio exceeds this limit, the resulting polymer is reduced in bulk density. On the other hand, the lower limit of the copolymerization ratio is not particularly set forth, though it is preferably 0.5% by weight.

In the second step for copolymerization, the copolymerization ratio of α-olefin to ethylene is elevated till the range of 3.0 to 20% by weight, preferably 5.0 to 20% by weight. If the copolymerization ratio of α-olefin exceeds 20% by weight, the bulk density lowering of the resulting polymer and the elevation of apparent viscosity of the slurry are unavoidable.

Polymers with the desired density can be obtained by controlling the copolymerization ratio of α-olefin and the formation proportion of polymer in each step for copolymerization. By way of example, those which are commercially available as the low density polyethylene from the so-called, high pressure polymerization process have a density of 0.915 to 0.927 g/cm$^3$, and for providing low density grades with the corresponding density range, the copolymerization ratio of α-olefin at the second step is, preferably, selected within the range of 5 to 10% by weight in case of using propylene as α-olefin and within the range of 7 to 15% by weight in case of using butene-1.

When products of the same density level are produced, copolymers with butene-1 exhibit bulk density higher than those with propylene.

Also, the formation proportion of polymer at the first copolymerization step should be within the range of 10 to 80% by weight, preferably 15 to 50% by weight based on the finally resulting polymer. If the formation proportion of polymer at the first step is less than 10% by weight, the finally resulting polymer has a bulk density of less than 0.3 g/cm$^3$ even when elevating the copolymerization ratio of α-olefin in the second step over 3% by weight, and thus the polymer slurry increases in apparent viscosity so that the advancing of the copolymerization reaction encounters difficulties. On the other hand, when the polymer formation proportion at the first step exceeds 80% by weight, a density of the final copolymer can be no longer lowered to the grade of less than 0.945 g/cm$^3$ even if elevating the copolymerization ratio of α-olefin in the second step till 20% by weight. The finally formed polymers (low density polyethylene) according to this invention contain an α-olefin of about 2 to 15% by weight.

With reference to the accompanying drawing, curve A represents the relation between bulk density and density of polymers obtained varying the copolymerization ratio in the first and second steps in accordance with Example 1 of this invention. Curve B represents the relation between bulk density and density of polymers obtained varying an amount of butene-1 by an One-step copolymerization process in accordance with Comparative Example 1 set forth hereinafter. It is apparent from the drawing that the low density polyethylene of about 0.910 to 0.925 g/cm$^3$ in density, which has been regarded as substantially impossible to produce with the conventional slurry polymerization process can be conveniently obtained without lowering a bulk density to the level of less than 0.30 kg/cm$^3$ by conducting the copolymerization in the two-step process of elevating the copolymerization ratio of α-olefin to ethylene successively. With the one-step copolymerization process, however, polymers having a density of less than 0.925 g/cm$^3$ cannot be obtained in the form of freely flowing due to the increase of adhesiveness and the irregular aggregation of the polymer particles (see Comparative Example 1).

According to this invention, polymers of 0.910 g/cm$^3$ in density, with the bulk density higher than 0.30 kg/cm$^3$ can be obtained in the form of freely flowing.

The first and second steps for copolymerization may be conveniently conducted at temperatures of 0° to 90° C. under pressures of from normal pressure to 50 kg/cm$^3$ (Gauge pressure). The molecular weight of the resulting polymer in each copolymerization step may be controlled, for example, by adding hydrogen to the polymerization system.

The molecular weight of polymer obtained in each of the above two copolymerization steps may be the same or different. In the field where a low density polyethylene with a narrow distribution of molecular weight is desired from the fabrication point of view, e.g. for use as a transparent and soft film, the molecular weight of polymer in each of the first and second steps may be desirably made uniform. On the contrary, in the field where products with a wide distribution of molecular weight is desired, e.g. for use as blow molding, pipes and nontransparent film, the molecular weight of polymer in each of the first and second steps may be, desirably, altered extensively.

Further, selecting of a solvent which is used in the first and second steps is of importance for producing the low density polyethylene of less than 0.945 g/cm$^3$ in density by the slurry process. It has been found that elevating of the slurry viscosity and lowering of the polymer bulk density, which are caused by partial dissolution of the resulting polymer can be avoided by using a hydrocarbon solvent of a boiling point at normal pressure of not higher than 40° C. Examples of such hydrocarbons include propane, n-butane, iso-butane, n-pentane, iso-pentane, cyclopropane, cyclobutane and mixtures thereof.

Amounts of extraction of polymers having various densities were measured varying a solvent as shown in Table 1.

Table 1

| Polymer Density g/cm$^3$ | Extraction Temperature °C | n-Butane % | n-Hexane % | n-Heptane % |
|---|---|---|---|---|
| 0.935 | 90 | 1.8 | — | 12.2 |
| 0.925 | 90 | 7.5 | — | 55.6 |
| 0.915 | 75 | 7.7 | 26.9 | — |

As seen from Table 1, with n-butane having a boiling point at normal pressure of not higher than 40° C., the amount of extraction of polymer is less than 10%, while with n-hexane and n-heptane having a boiling point of higher than 40° C., the amount of extraction is more than 10%.

When the amount of extraction at the polymerization temperature exceeds 10%, advancing of the slurry polymerization becomes difficult due to elevating of the solvent viscosity. With use of n-butane as the solvent, polymers of less than 0.935 g/cm$^3$ in density can be obtained. With use of hexane or heptane, however, the resulting polymer becomes paste-like and therefore brings about serious troubles in the after-treatment of the polymer slurry, which is usually effected, such as filtrating and drying. Thus, in the latter, polymers in the form of freely flowing powders cannot be obtained.

In the copolymerization of this invention, the reaction temperature is selected in such a way that the amount of extraction of polymer with the solvent is less than 10% preferably 5%. The amount of extraction of polymer becomes higher as the molecular weight of the solvent becomes larger. In the event of use of n-butane, since polymers of 0.915 g/cm$^3$ in density have an extraction amount of 7.7% at 75° C., there are no troubles in elevating the reaction temperature to 75° C.

As mentioned above, the low density polyethylene having a bulk density of high level is obtained according to this invention and as a result, there are practical advantages that a capacity efficiency of reaction vessels is increased, the amount of the solvent per unit quantity of the resulting polymer is saved, and no filtrating of the polymer slurry the amount of the solvent adhering to the cake is reduced.

The low density polyethylene slurry obtained by this invention may be treated in the usual manner, separated in the form of powdered polymers and worked up to products.

Since the low density polyethylenes according to this invention are free of chain branching, they distinctly differ from the polyethylene from the so-called, high pressure polymerization process, and therefore exhibit specific properties which are suitable for such processings as injection molding, blow molding, extrusion molding and the like.

This invention will be illustrated by the nonlimitative examples.

EXAMPLE 1

Supported catalyst component (A) with a titanium content of 2% by weight was obtained by copulverizing 23 parts by weight of anhydrous magnesium chloride, 2.5 parts by weight of titanium tetrachloride and 4.5 parts by weight of aluminum chloride-diphenyl ether complex.

A mixture of 3.0 g of the above component (A) and 25 g of triethylaluminum in 1 liter of heptane was charged into a 2 liter autoclave in which 30 g of ethylene were then reacted at 50° C. while maintaining the whole pressure below 3 kg/cm$^2$. Thus a pre-polymer slurry was obtained. The amount of ethylene pre-polymerized was 10 g/g.cat (A) (indicated by g per 1.0 g of the catalyst component (A)).

Next, to a 500 l autoclave which had previously been purged with nitrogen were 145 kg of n-butane and 6.2 kg of butene-1 added, and then hydrogen and ethylene were added, and the temperature was elevated to 75° C. At this time, upon analysis of the vapour phase, the concentrations of butene-1 and hydrogen to ethylene were 6 mol % and 15 mol %, respectively. Thereafter, the whole amount of the above pre-polymer slurry was charged into the above 500 l autoclave where 18 kg of ethylene were then polymerized at 75° C. over 1 hour while feeding ethylene to maintain the whole pressure at 15 kg/cm$^2$.

The polymer thus obtained had a melt index (MI) of 1.0 and a butene-1 copolymerization ratio of 2.9 weight %, which was measured by infrared absorption. Next, butene-1 was further added to elevate the concentration ratio of butene-1 to ethylene in the vapour phase up to 15 mol % and reaction was conducted at 75° C. for further 2.5 hours to obtain 65 kg of end copolymer. 1 liter of methanol was added to stop the reaction and the resulting slurry was filtered and dried. The polymer thus obtained had:
MI: 1.0
Density: 0.915 g/cm$^3$
Butene-1 Content: 12 weight %
Bulk Density: 0.38 g/cm$^3$ In this example, the formation proportion of polymer at the first copolymerization step was 28% by weight based on the finally formed polymer, and the copolymerization ratio of butene-1 at the second step was 15.5% by weight.

COMPARATIVE EXAMPLE 1

Using a catalyst consisting of 3.0 g of the same catalyst component (A) as in Example 1 and 25 g of triethylaluminum, a pre-polymer slurry was obtained by reacting 30 g of ethylene in a 2 liter autoclave at 50° C. in the same manner as Example 1.

Into a 500 l autoclave which had previously been purged with nitrogen were the whole amount of the above pre-polymer slurry, 145 kg of n-butane and 36 kg of butene-1 fed. Next, hydrogen was added, the reaction system was elevated to 75° C. and then, ethylene was fed to maintain the whole pressure at 15 kg/cm$^2$. After 2 hours, the absorption of ethylene finished substantially, then 1 liter of methanol was added and the above n-butane solvent was purged. When the autoclave was opened to check the inside, sticky polymers were formed and the deposition of polymers on the stirrer and the baffle was observed. An amount of polymers after drying was 35 kg.
Density: 0.925 g/cm$^3$
MI: 1.0
Butene-1 Content: 9.0 weight %

The polymer particles obtained adhered to one another so that the measurement of bulk density was impossible.

EXAMPLE 2

Supported catalyst component (A) with a titanium content of 3 weight % was obtained by supporting titanium tetrachloride on a support which was obtained by heating hydrotalcite (Mg$_6$Al$_2$(OH)$_{16}$CO$_3$.4H$_2$O) at 400° C.

19 g of the above catalyst component (A) and 40 g of triisobutylaluminum together with 2 liter of iso-butane were charged into a 5 liter autoclave where hydrogen was then added till a hydrogen partial pressure of 1 atm., and a pre-polymer slurry was obtained by reacting 500 g of ethylene at 70° C. The amount of ethylene pre-polymerized was 26 g/g.cat(A).

Into a 500 l autoclave purged previously with nitrogen were 126 kg of iso-butane and 1.0 kg of butene-1 charged and elevated to 70° C. Hydrogen and ethylene were added till a hydrogen partial pressure of 7.5 atms and an ethylene partial pressure of 5.8 atms, respectively and the whole amount of the above pre-polymer slurry was added.

25 kg of polymers were obtained by conducting polymerization at 70° C. for 1 hour while adding ethylene to maintain the whole pressure at 21 atms. The polymer formed at this step had a MI of 8.0 and a butene-1 copolymerization ratio of 1.4 weight %.

Next, the temperature of the polymerization system was lowered to 60° C. and 50 kg of butene-1 were added. Polymerization was conducted at 60° C. for 3 hours while feeding ethylene to maintain the whole pressure at 16 atms. Thereafter, 50 g of iso-butanol were added to discontinue the reaction. After separating the above iso-butane solvent, 84 kg of copolymers were obtained.
MI: 1.5
Density: 0.910 kg/cm$^3$
Butene-1 Content: 14.0 weight %
Bulk Density: 0.35 g/cm$^3$ In this example, the formation proportion of polymer at the first copolymerization step was 30% by weight based on the finally formed polymer, and the butene-1 copolymerization ratio at the second step was 19 weight %.

EXAMPLE 3

Supported catalyst component (A) with a titanium content of 1.2 weight % was obtained by heating triisopropoxyaluminum with magnesium hydroxide in equal weight at 600° C, refluxing the above treated product in titanium tetrachloride for 5 hours, filtrating the resultant and washing many times with hexane, followed by drying.

60 g of the above component (A) and 60 g of diisobutylaluminum monohydride in 1 liter of heptane were charged into a 2 liter autoclave, where hydrogen was then added till a hydrogen partial pressure of 2 atms, and 500 g of ethylene were reacted at 50° C., while maintaining the whole pressure below 5 atms., to obtain a pre-polymer slurry. The amount of ethylene pre-polymerized was 8.3 g/g.cat (A).

Into a 500 l autoclave purged previously with nitrogen were 145 kg of iso-butane charged, elevated to 60° C., and hydrogen was fed till a hydrogen partial pressure of 3 atms. Thereafter, ethylene containing 2 mol % of propylene was fed to maintain the whole pressure at 20 atms. 20 kg of ethylene were reacted at 60° C. over 1 hour. The polymer obtained at this step had a MI of 0.5 and a propylene copolymerization ratio of 2.2 weight %.

Next, ethylene containing 7 mol % of propylene was fed and reacted at 60° C. over 3 hours while maintaining the whole pressure at 20 atms. Thereafter, 500 g of iso-propanol were added to discontinue the reaction. After separation of the solvent, 62 kg of copolymers were obtained.
MI: 0.3
Density: 0.920 g/cm$^3$
Propylene Content: 7.5 weight %
Bulk Density: 0.31 g/cm$^3$ In this example, the formation proportion of polymer at the first copolymerization step was 32% by weight based on the finally formed polymer, and the propylene copolymerization ratio at the second step was 10 weight %.

What is claimed is:

1. A method for the production of a low density ethylene copolymer of not higher than 0.945 g/cm$^3$ by copolymerizing ethylene and an α-olefin, which comprises:
   (i) using a catalyst consisting essentially of (A) a catalyst component having titanium tetrachloride supported on a magnesium compound or a mixture or reaction product thereof with an aluminum compound and (B) an organoaluminum compound,
   (ii) subjecting ethylene to pre-polymerization in the presence of said catalyst prior to the copolymerization, the amount of ethylene to be pre-polymerized being within the range of 1.0 to 50 g per 1.0 g of said catalyst component (A), (iii) conducting the copolymerization of ethylene and an α-olefin in a two-step process of:
  (a) first, conducting the copolymerization until polymers of 10 to 80% by weight based on a finally resulting polymer have been formed while controlling the copolymerization ratio of α-olefin to ethylene at less than 3.0% by weight, and
  (b) completing the polymerization reaction while elevating the copolymerization ratio of α-olefin to ethylene to the range of 3.0 to 20% by weight, and (iv) conducting said copolymerization in slurry state in the presence of a hydrocarbon solvent having a boiling point of not higher than 40° C. at temperature of not higher than 100° C.